Figure 1:
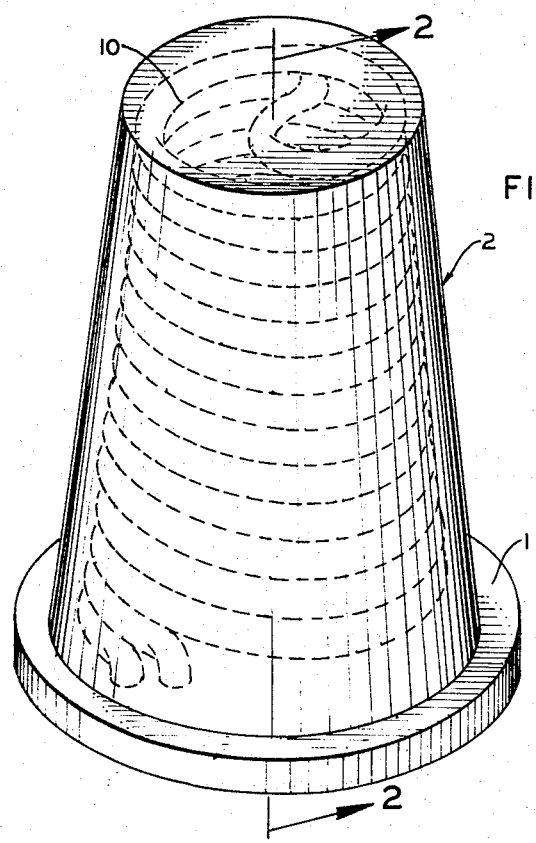

Jan. 7, 1969  R. K. SHELBY  3,419,939
HEATER FOR FORMING PLASTIC BODIES
Filed Jan. 2, 1964

INVENTOR:
RICHARD K. SHELBY
BY
ATTORNEY

Jan. 7, 1969  R. K. SHELBY  3,419,939
HEATER FOR FORMING PLASTIC BODIES
Filed Jan. 2, 1964

INVENTOR.
RICHARD K. SHELBY
BY *Herman O. Bauermeister*
ATTORNEY

United States Patent Office 3,419,939
Patented Jan. 7, 1969

3,419,939
HEATER FOR FORMING PLASTIC BODIES
Richard K. Shelby, Downers Grove, Ill., assignor to Monsanto Company, St. Louis, Mo., a corporation of Delaware
Filed Jan. 2, 1964, Ser. No. 335,034
U.S. Cl. 18—35                    1 Claim
Int. Cl. B29c *1/00;* B29h *5/22*

The present invention relates to the molding of plastic articles. More specifically it pertains to a method of manufacturing such articles, to apparatus for molding hollow articles from plastic sheet material, and to a process for making such apparatus.

Today it has become a common practice to employ thermoplastic material in the manufacture of thin walled containers and similar products, since materials of this type are capable of being thermoformed. Thermoplastic materials such as polystyrene and modified polystyrene have been used in large proportions inasmuch as these materials possess the necessary properties for molding operations. Large webs of this type of thermoplastic material are normally passed through a pair of cooperating dies forming a part of the molding machine. However, prior to the passage between the dies where the web is formed into thin walled products, the web of thermoplastic material must be preheated to a suitable temperature at which it is sufficiently elastic and capable of being readily molded when it is subsequently passed between the dies. Normally, the dies are also provided with suitable heating means to bring the thermoplastic material up to the molding temperature while the material is being formed within the dies.

Because of the mechanical difficulties encountered in heating the dies, the usual heating means are either indirect-type heaters external from the dies, or simple cartridge type heaters located in drilled holes in the dies. However, the nonuniform heating resulting from such methods has resulted in a number of practical difficulties.

Prior to the instant invention, problems have been encountered in the molding of hollow articles from moldable sheet material. It has been the practice to move a forming die into engagement with a retained sheet to distort and stretch it, and to draw the distorted sheet onto the surface of the die to be there molded into shape. It has been found, when following this method, that undesirable strain areas were formed in the finished article in the areas initially contacted by the die and that the material adjacent to these areas became abnormally thin during the drawing or distorting of the sheet.

One method which has been described in the literature to improve the plastic sheet material such as polystyrene, is the passing of the sheet of plastic through an oven section before carrying out the forming or molding operation.

It has also been suggested to drill a hole into the die in order to place a rod-shaped heater into the drilled hole. However, the distribution of heat from such heaters has been found to be quite nonuniform. Because of such nonuniform heating, the molded articles such as dishes, cups and the like exhibit thin areas at the regions of highest temperature, and at the regions subjected to the greatest distortion during formation or as the result of initial contact with the die.

The present invention overcomes these problems by providing a method and apparatus in which the moldable material is uniformly drawn during the actual forming operation. Consequently, when the pre-forming operation is completed by contacting the thermoplastic material against the male die surface for molding, distribution of the material is uniform thereover, with a resultant elimination of strains and thin areas. It is, therefore, an object of the invention to provide a method for molding hollow articles from sheet material which method substantially eliminates the causes of strain and thin areas in the finished article, and results in a uniformly molded product.

It is also an object of the invention to provide an apparatus for molding hollow articles, wherein the sheet material from which the article is formed is uniformly formed when in contact with the male forming die, so that in a subsequent vacuum and for pressure forming operation, the sheet is evenly distributed on the molding surface of the die and drawn across portions thereof.

A feature of the invention is the provision of uniform heating of the forming male die. The die apparatus employed in the practice of the present invention contains a spirally-disposed heating element located within the body of the die. With relatively flat shaped dies such as the male die used in forming rimmed plates, the spiral heating element is more or less pancake-shaped in the flat portion, with added ring sections extending up into the rim portion. However, with deep-drawing dies such as the male die used in forming cups, the spiral of the heating element is more helical in shape from the bottom to the top of the die. In order to bring the ends of the heater through the base of the die, a double spiral is conveniently employed. It is preferable to dispose the heating spiral which may be preformed, insulated electric heating element quite close to the external surface of the die, specifically with the center line of the heating element being located at a distance from the external surface of the die corresponding to from one to two diameters of the heating element. For example, in a nominal three inch male die, with a helically located quarter-inch insulated (metal jacketed) electric element, the disposition of the center line of the helix within the die is preferably from one-quarter to one-half inch.

The present method of heating from a spirally disposed, embedded heater in the die is also applicable to the female die section e.g. for the plate and cup molding operations described above.

Figure 2:
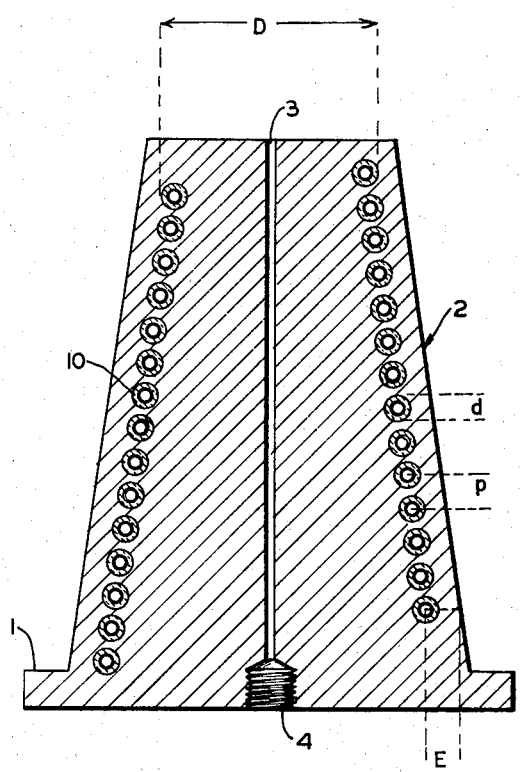
Figure 3:
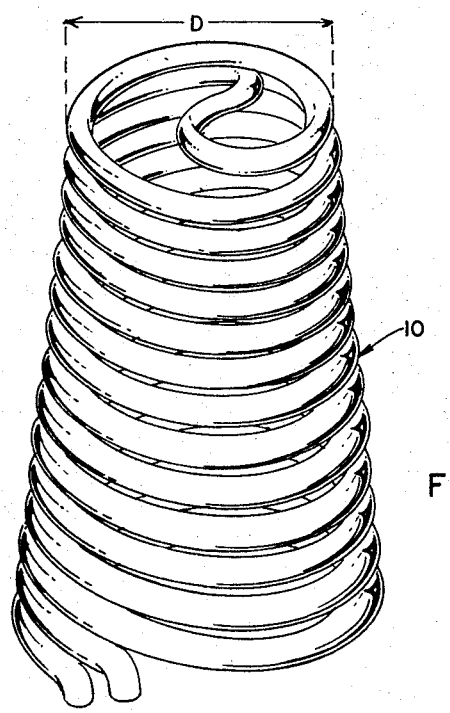
Figure 4:
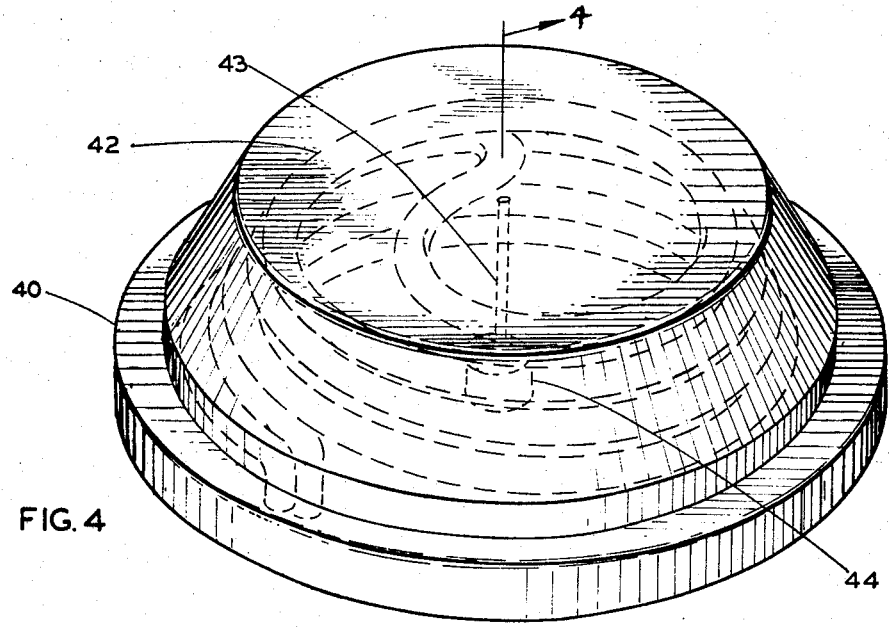
Figure 5:
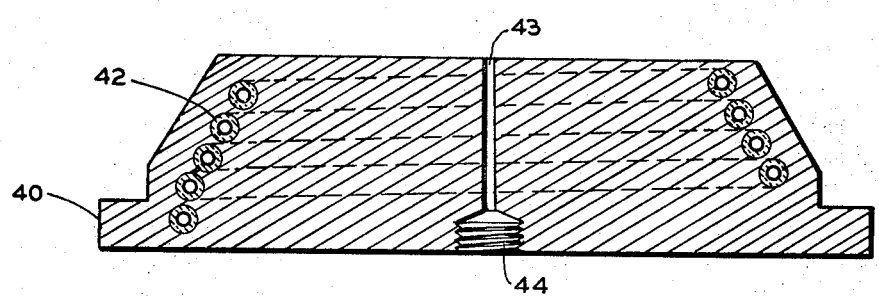
Figure 6:
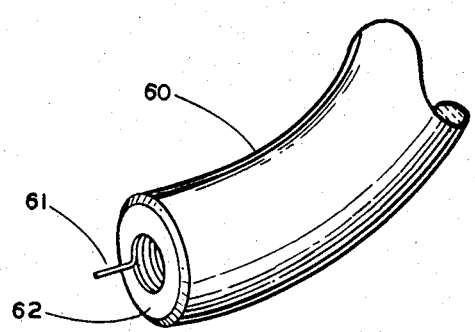

Referring now to the drawings for a more detailed description of the invention, FIGURE 1 is a perspective view of a male mold, the exterior shape of which generally conforms to a cup shape, and which embodies the present invention. FIGURE 2 is a vertical sectional view taken along 2—2 of FIGURE 1, while FIGURE 3 shows the heating element of FIGURE 1. FIGURE 4 illustrates a perspective view of a modified form of a male mold, the exterior shape of which generally conforms to a plate type mold provided with an internally disposed spiral heating element, while FIGURE 5 is a vertical sectional view taken along 4—4 of FIGURE 4. FIGURE 6 shows a detail of the heating element of FIGURES 1–5.

FIGURE 1 represents the body of the male mold. This mold is employed as a heated male die or so-called "plug assist" of the type employed in U.S. Patent No. 2,967,328 to Richard K. Shelby, et al. The mold is preferably formed of a noncorrosive metal relative to the thermoplastic materials to be formed, suitable metals being stainless steel, aluminum, magnesium, copper, bronze and other alloys, as well as plastic materials such as Bakelite containing various reinforcing agents such as fiberglass. In FIGURE 1, element 1 is the base of the die, such base being circular in horizontal cross section. For a three inch maximum diameter cup the thickness of the base may be varied in accordance with the vertical position required for the die, such thickness varying between 1/16 inch and 1 inch. Integrally formed with base 1 is the cup shaped mold body 2 which tapers inwardly with a spherical curvature of large radius e.g. 23 inches or with the desired angle such as from about 2° to 20° from the vertical, relative to base 1. Element 3 is a vent line suitable for the application of vacuum or pressure during the forming operations while 4 represents a threaded opening for the said vent line. Element 10 is the spiral heating element disposed within the body of the present heating element. This spiral heating element as described below is preferably a metal jacketed, insulated electric resistance element, although other heat sources maintained in sutiable metal jackets, for example, steel or copper tubing having a fluid passing therethrough, e.g., steam, hot water, hot oil or metals such as lead and alloys thereof, or aromatic compounds such as chlorinated polyphenyl compounds may also be used as the flowing liquid heat transfer medium. The shaping of the convolutions of the conical spiral varies in accordance with the diameter of the heating element itself. However, a preferred spacing is ½ to 4 convolutions per inch measured along the face of the spiral.

The convolutions of the spiral are circular with a diameter $d$ as illustrated in FIGURES 2 and 3. Furthermore, the convolutions are situated in the die from the exterior surface thereof which is from one to two times the diameter $d$. In other words, the distance E, FIGURE 2, which is measured from the axial centerline of any element of a convolution of the helix to the exterior surface of the male die 2 is from one to two times the diameter $d$ of this element of the convolution. The pitch P of the convolutions of the helix is defined to be the distance between two vertically spaced and adjacent turns or convolutions of the spiral or helix as illustrated in FIGURE 2. The pitch P should preferably bear a definite ratio to the diameter D of the helix so that the pitch P is from 0.10D to 0.50D, or preferably P is from 0.15D to 0.30D. The diameter D is measured from two diametrally opposed points on the exterior margin of any one convolution as illustrated in FIGURES 2 and 3. In other words, the diameter D of any convolution of the helix is measured in a horizontal plane passing through that convolution.

The male mold shown in FIGURE 1 is employed together wtih a conventional, or similarly heated female mold (not shown) for the formation of cups from thermoplastic materials. The base of the male mold is indicated as element 1 while the body of the mold is indicated as 2. The mold is also provided with certain internal details likewise indicated by the same numerals in FIGURE 2. Thus, a conduit for the admission of compressed air or vacuum is indicated as element 3 which passes longitudinally through the mold and is provided with a threaded socket 4 for connection to an external source of compressed air or vacuum. The heating element which is the preferred embodiment of the invention is an electric heating coil provided as a flexible member as indicated as element 10 in FIGURE 3, as well as the other drawings. FIGURE 6 shows a detailed view of the heating element illustrating the disposition of an electrical resistance winding 61 held spirally within heating jacket 60 and being secured by means of insulation 62.

FIGURE 3 shows the spiral, metal-jacketed heating element of FIGURE 1, showing the location of the two external leads which are connected to a suitable source of electricity.

In FIGURES 4 and 5 a dish mold is illustrated. Element 40 represents the body of the mold while 42 is the internally disposed spiral. Element 43 is the vent line for pressure or vacuum while 44 is the threaded fitting for the vent. FIGURE 5 is a cross section along 4—4 of FIGURE 4, showing certain elements common to FIGURE 4. FIGURE 6 shows in detail a typical heating element of the electrical type used in manufacturing the heating elements of the present invention.

In FIGURE 6, element 60 is a metal jacket such as a steel, nickel or alloy, e.g., a nickel or tantalum alloy which does not melt when the element is situated in a mold to be filled with aluminum or other die metal. Element 61 is an electrical resistance winding, such as Nichrome, while 62 represents an insulating material such as asbestos, mica or magnesia.

In addition to the novel spirally heated dies and the method of heating a sheet of plastic by the application of heat from a spirally disposed heating unit in a die, the present invention also includes the manufacture of such die units, as described above. It has been found that highly effective, uniformly-heating dies are obtained by this process. Essentially this manufacturing process comprises the securing of an insulated electric resistance heating unit in a three dimensional spiral within a casting mold such as by suspension of the heater twisted into a spiral form. Into this mold there is then poured a liquid medium which solidifies to a rigid form, such as a metal, for example, aluminum, magnesium, copper, bronze and other alloys. However, if a plastic material such as Bakelite with various reinforcing agents such as fiberglass is desired, it is also readily cast in the present process. The casting operation may also provide for vents, thermocouple wells, vacuum and/or pressure lines by the use of cores or heat resistant pipes, etc. After solidification of the casting, it is removed from the mold. Finishing operations include machining, polishing and plating, if desired, by conventional procedures.

What is claimed is:

1. A molding die for contacting plastic sheet material and molding articles from the same, said molding die comprising a base member, an upstanding forming member operatively secured to said base member, said forming member having an annular side wall, an electrically energizable heating element firmly embedded in said upstanding forming member and integrally disposed therein, said heating element being shaped in the form of a spiral with convolutions and a space between each of the spirals, said heating element including a reverse helically shaped portion which has convolutions in the space between said first named convolutions, the convolutions of said heating element having a substantially circular cross section with diameter $d$, each of the convolutions of the spiral heating element being spaced from the exterior annular side wall by a distance which is from one to two times the diameter $d$ as measured from the spirally shaped axial centerline passing through the convolutions to the exterior annular side wall, the vertical spacing between each of said convolutions as measured from the axial centerline passing through each of two vertically spaced adjacent convolutions being from 0.10 to 0.50 times the overall diameter D of the spiral in a horizontal plane passing through one of the convolutions from which measurement is being made, and electrical terminal portions operatively attached to said heating element and extending outwardly from said base.

References Cited

UNITED STATES PATENTS

| | | | |
|---|---|---|---|
| 1,509,042 | 9/1924 | Kay | 219—304 |
| 1,817,214 | 8/1931 | Stuckwisch | 219—304 |
| 2,489,643 | 11/1949 | Hunter | 219—304 |
| 2,303,303 | 11/1942 | Schleicher | 264—219 X |
| 2,317,597 | 4/1943 | Ford et al. | 18—38 |
| 2,406,678 | 8/1946 | Gerahty. | |
| 2,665,724 | 1/1954 | Lundell | 18—12 X |
| 3,121,920 | 2/1964 | Doyle et al. | 18—35 |
| 3,181,200 | 5/1965 | Joseph | 18—38 |
| 3,208,104 | 9/1965 | Hessel | 18—19 |
| 3,258,813 | 7/1966 | Groth et al. | 18—19 |

FOREIGN PATENTS 684,191  12/1952  Great Britain.

WILLIAM J. STEPHENSON, *Primary Examiner.*

U.S. Cl. X.R.

18—38; 219—243